(12) United States Patent
De Rick et al.

(10) Patent No.: US 12,291,876 B2
(45) Date of Patent: May 6, 2025

(54) FLOOR OR WALL PANEL

(71) Applicant: FLOORING INDUSTRIES LIMITED, SARL, Bertrange (LU)

(72) Inventors: Jan De Rick, Geraardsbergen (BE); Benjamin Clement, Waregem (BE); José Meirlaen, Deinze (BE); Marijn Seynaeve, Moen (BE)

(73) Assignee: UNILIN, BV, Wielsbeke (BE)

( * ) Notice: Subject to any disclaimer, the term of this patent is extended or adjusted under 35 U.S.C. 154(b) by 307 days.

(21) Appl. No.: 17/797,841

(22) PCT Filed: Jan. 14, 2021

(86) PCT No.: PCT/IB2021/050241
§ 371 (c)(1),
(2) Date: Aug. 5, 2022

(87) PCT Pub. No.: WO2021/156689
PCT Pub. Date: Aug. 12, 2021

(65) Prior Publication Data
US 2023/0055973 A1    Feb. 23, 2023

Related U.S. Application Data (60) Provisional application No. 63/119,417, filed on Nov. 30, 2020, provisional application No. 63/041,307, (Continued)

(51) Int. Cl.
*E04F 15/00* (2006.01)
*B32B 3/06* (2006.01)
(Continued)

(52) U.S. Cl.
CPC .......... *E04F 15/02038* (2013.01); *B32B 3/06* (2013.01); *B32B 7/12* (2013.01);
(Continued)

(58) Field of Classification Search
CPC ............ E04F 13/0894; E04F 15/02038; E04F 15/107; E04F 13/14; E04F 2201/042;
(Continued)

(56) References Cited

U.S. PATENT DOCUMENTS 10,697,184 B2 * 6/2020 De Rick ........... E04F 15/02038
11,053,693 B2 * 7/2021 De Rick ........... E04F 15/02038
(Continued)

FOREIGN PATENT DOCUMENTS

CA   3103688 A1   12/2019
EP   1026341 B1   8/2003
(Continued)

OTHER PUBLICATIONS

International Search Report from PCT Application No. PCT/IB2021/050241, May 11, 2021.

*Primary Examiner* — Chi Q Nguyen
(74) *Attorney, Agent, or Firm* — Workman Nydegger (57) ABSTRACT

The floor or wall panel has a substrate and a top layer applied thereon. The substrate consists mainly of a mineral material. The panel is provided, on at least two opposite edges, with coupling means that allow two such panels to be coupled together at the respective edges, wherein in the coupled state there is locking in the vertical direction perpendicular to the plane of the coupled panels and in the horizontal direction perpendicular to the coupled edges and in the plane of the coupled panels.

18 Claims, 10 Drawing Sheets

Related U.S. Application Data filed on Jun. 19, 2020, provisional application No. 62/977,455, filed on Feb. 17, 2020, provisional application No. 62/971,399, filed on Feb. 7, 2020.

(51) Int. Cl.
| | | |
|---|---|---|
| *B32B 7/12* | (2006.01) | |
| *B32B 19/04* | (2006.01) | |
| *E04F 13/08* | (2006.01) | |
| *E04F 13/14* | (2006.01) | |
| *E04F 15/02* | (2006.01) | |
| *E04F 15/08* | (2006.01) | |

(52) U.S. Cl.
CPC .......... *B32B 19/04* (2013.01); *E04F 13/0894* (2013.01); *E04F 13/14* (2013.01); *E04F 15/08* (2013.01); *B32B 2307/546* (2013.01); *B32B 2419/04* (2013.01); *B32B 2607/00* (2013.01); *E04F 2201/0107* (2013.01); *E04F 2201/0153* (2013.01); *E04F 2201/023* (2013.01); *E04F 2201/042* (2013.01); *E04F 2201/043* (2013.01)

(58) Field of Classification Search
CPC .......... E04F 2201/0107; E04F 2201/03; E04F 15/08; E04F 2201/0115; E04F 2201/0153; E04F 2201/0552; E04F 2201/023; E04F 2201/0535; E04F 2201/0146; E04F 2201/043; E04F 2201/0547; E04F 2201/0138; B32B 2471/00; B32B 3/06; B32B 7/12; B32B 19/04; B32B 2307/546; B32B 2419/04; B32B 2607/00

See application file for complete search history.

(56) References Cited

U.S. PATENT DOCUMENTS

| | | | |
|---|---|---|---|
| 11,072,929 B2 * | 7/2021 | De Rick | E04F 13/0894 |
| 11,525,268 B2 * | 12/2022 | De Rick | B32B 27/304 |
| 11,739,538 B2 * | 8/2023 | De Rick | E04F 15/10 |
| | | | 52/588.1 |
| 11,788,300 B2 * | 10/2023 | De Rick | E04F 13/0832 |
| | | | 52/506.05 |
| 11,834,843 B2 * | 12/2023 | Schacht | B32B 27/304 |
| 11,858,165 B2 * | 1/2024 | De Rick | B27F 1/02 |
| 12,049,762 B2 * | 7/2024 | De Rick | E04F 15/105 |
| 2004/0250492 A1 * | 12/2004 | Becker | E04F 15/04 |
| | | | 52/578 |
| 2011/0167744 A1 | 7/2011 | Whispell et al. | |
| 2013/0104485 A1 * | 5/2013 | Meersseman | B27N 7/00 |
| | | | 428/53 |
| 2016/0177577 A1 * | 6/2016 | Cappelle | B65D 85/62 |
| | | | 52/582.2 |
| 2021/0030303 A1 * | 2/2021 | Gärber | A61B 5/7246 |

FOREIGN PATENT DOCUMENTS

| | | |
|---|---|---|
| WO | 2019064113 A1 | 4/2019 |
| WO | 2019137964 A1 | 7/2019 |

* cited by examiner

FLOOR OR WALL PANEL

FIELD OF THE DISCLOSURE

The present invention relates to a floor panel or a wall panel that provides new properties relating to water resistance and fire-retardant action.

BACKGROUND

Fire-retardant and waterproof materials may be brittle.

SUMMARY

The inventor has succeeded in providing panels with a substrate based on said brittle materials, with a sufficiently strong glueless locking system. In particular, according to preferred embodiments of the present invention, suitable selection of the material together with an ingenious locking system for this is presented, wherein any stress points present are mitigated because small roundings and sharp points are avoided in these places.

The inventor has established that stress in the system may arise in particular when coupling together a glueless locking system that consists essentially of a tongue and groove joint with locking elements. Thus, when angling the tongue into the groove, a fracture may occur on the upper side of the tongue where this adjoins the edge, and/or on the underside of the lower lip where this adjoins the deepest portion of the groove. This kind of stress is even greater in systems wherein the male part can be inserted in the female part by means of a horizontal or downward movement. Stress in the system may also arise when it is produced in the substrate, for example by a milling operation. Thus, rotating milling cutters exert a high pressure on the materials that are of interest for this. Cracks or microcracks that formed during the milling process may be propagated during installation and use of a covering assembled from the panels of the invention.

Fractures in the coupling system lead not only to mechanical failure of the locking system but may also lead to visible defects on the surface of the panels, because of upsetting and/or accelerated wear of the decorative top layer.

The first aspect of the invention is a floor or wall panel, wherein this panel has a substrate and a top layer applied thereon, characterized in that the substrate mainly consists of a mineral material, and in that the panel is provided on at least two opposite edges with coupling means that allow two such panels to be coupled together at the respective edges, wherein in the coupled state there is locking in the vertical direction perpendicular to the plane of the coupled panels and in the horizontal direction perpendicular to the coupled edges and in the plane of the coupled panels.

Preferably the mineral material comprises a mineral binder, which at least forms the matrix of the substrate.

In a preferred embodiment of the invention, the floor or wall panel is characterized in that the aforementioned coupling means of the one edge of the at least two opposite edges comprises at least a male part in the form of a tongue; and in that the aforementioned coupling means on the other edge of the at least two opposite edges comprise at least a female part in the form of a groove, wherein this groove is flanked by a lower lip and an upper lip. Preferably the lower lip comprises a locking element and the bottom edge of the tongue comprises a recess wherein in the coupled state of two such panels the contact between the locking element and the recess provides locking of the coupled panels in the direction perpendicular to the edges coupled in this way and parallel to the plane of the coupled panels.

In a preferred embodiment of the invention, the floor or wall panel is characterized in that the aforementioned coupling means comprise at least a male part in the form of a tongue, wherein this tongue comprises a sideways projection formed on the respective edge, and in that the sideways projection on the upper side thereof adjoins a surface or plane of the edge extending substantially vertically, wherein the junction of the upper side of the sideways projection with the surface or plane of the edge extending substantially vertically is free from roundings with a radius less than 0.2 mm and/or in that the angle between the vertices formed between adjacent surfaces of this junction is always greater than 150°, and preferably greater than 160°. These measures prevent fracture and/or cracking occurring in the coupling parts during production of the panels and/or during coupling of the panels to the edges where these coupling parts are located.

In a preferred embodiment of the invention, the floor or wall panel is characterized in that the aforementioned coupling means comprise at least a male part in the form of a tongue, wherein this tongue comprises a sideways projection formed on the respective edge, and in that the sideways projection on the upper side thereof adjoins a surface or plane of the edge extending substantially vertically, wherein the junction of the upper side of the sideways projection with the surface or plane of the edge extending substantially vertically is curved and adjoins a non-curved part of the sideways projection, wherein the curved junction extends in the distal direction to beyond the vertical plane defined by the vertical contact surface of the edge provided with the male part in the form of a tongue, wherein this vertical contact surface is designed to make contact with a vertical contact surface of the panel to which this edge is coupled. These measures prevent fracture and/or cracking occurring in the coupling parts during production of the panels and/or during coupling of the panels to the edges where these coupling parts are located.

In a preferred embodiment of the invention, the floor or wall panel is characterized in that the aforementioned coupling means comprise at least a female part in the form of a groove, wherein this groove is flanked by a lower lip and an upper lip, and wherein the lower surface of the upper lip adjoins the portion of the groove situated most inward, wherein the junction of the lower surface of the upper lip with the portion of the groove situated most inward is free from roundings with a radius less than 0.2 mm and/or in that the angle between the vertices formed between adjacent surfaces of this junction is always greater than 150°, and preferably greater than 160°. These measures prevent fracture and/or cracking occurring in the coupling parts during production of the panels and/or during coupling of the panels to the edges where these coupling parts are located.

In a preferred embodiment of the invention, the floor or wall panel is characterized in that the aforementioned coupling means comprise at least a female part in the form of a groove, wherein this groove is flanked by a lower lip and an upper lip, and wherein the upper surface of the lower lip adjoins the portion of the groove situated most inward, wherein the junction of the upper surface of the lower lip with the portion of the groove situated most inward is free from roundings with a radius less than 0.2 mm and/or in that the angle between the vertices formed between adjacent surfaces of this junction is always greater than 150°, and preferably greater than 160°. These measures prevent fracture and/or cracking occurring in the coupling parts during production of the panels and/or during coupling of the panels to the edges where these coupling parts are located.

In a preferred embodiment of the invention, the floor or wall panel is characterized in that in the coupled state of two such panels there is no horizontal contact surface between the upper edge of the tongue and the bottom edge of the upper lip, but wherein this contact surface slopes downward over its entire length in the direction toward the distal end of the tongue. This ensures that the junction can be made with an even larger radius. This ensures that stresses in the coupling means are reduced, so that no fracture and/or cracking occurs in the coupling parts during milling of these coupling parts and during coupling of these panels.

In a preferred embodiment of the invention, the floor or wall panel is characterized in that in the coupled state the aforementioned coupling means fit into one another with a press fit.

In a preferred embodiment of the invention, the floor or wall panel is characterized in that the aforementioned coupling means can be fitted into each other by means of an angling movement and/or by a sliding movement substantially parallel to the surface of the panel.

In a preferred embodiment of the invention, the floor or wall panel is characterized in that the aforementioned coupling means have one or more of the following properties:
   the property that the mechanical coupling means or coupling parts are mainly made as a tongue and a groove delimited by an upper lip and a lower lip, wherein said tongue and groove are mainly responsible for the locking in the aforementioned vertical direction perpendicular to the surface of the panels, and wherein the tongue and the groove are provided with locking elements, mainly responsible for the locking in the aforementioned horizontal direction perpendicular to the edges and parallel to the surface of the panels. Preferably the locking elements comprise a projection on the lower lip of the groove and a recess interacting therewith on the underside of the tongue.
   the property that the mechanical coupling means or coupling parts press the coupled floor panels against each other, for example because these mechanical coupling means are made with so-called pretension, as is known per se from EP 1 026 341. The clamping force with which the floor panels are pressed against each other or toward each other may for example, in combination with the above property, be obtained on the basis of a lower lip curved outward in the coupled position, which in an attempt to spring back, presses against the underside of the tongue. This provides a number of advantages, for example the panel is more resistant to ingress of moisture. However, to achieve this, the lower lip must be able to bend during coupling, so that the risk of fracture is greater.
   the property that the mechanical coupling means allow coupling based on a horizontal, or quasi-horizontal, sliding movement of the panels toward each other;
   the property that the mechanical coupling means allow coupling based on an angling movement along the respective edges;
   the property that the mechanical coupling means allow coupling based on a downward directed movement of a male coupling part, for example with a tongue, into a female coupling part, for example with a groove;
   the property that the mechanical coupling means, or at least the associated upper edge is produced on the basis of a milling operation using rotating milling cutters;
   the property that the aforementioned coupling means are mainly made in the aforementioned substrate, preferably the aforementioned coupling means are provided on the basis of a milling operation using rotating milling cutters.

In a preferred embodiment of the invention, the floor or wall panel is characterized in that the panel is oblong and rectangular and in that the aforementioned two opposite edges refer to the pair of long edges of the panel.

Preferably on the pair of short opposite edges the panel is also provided with coupling means with or without features as stated in one or more of the embodiments of the invention in connection with the pair of long edges.

More preferably, the coupling means of the pair of short opposite edges can be fitted into each other by means of a substantially horizontal movement of the panels toward each other and/or by means of a rolling movement.

In a preferred embodiment of the invention, the floor or wall panel is characterized in that the aforementioned substrate has an average density of 900 kg per cubic meter or more, for example 1000 or 1300 kg per cubic meter, or more.

In a preferred embodiment of the invention, the floor or wall panel is characterized in that the aforementioned top layer is selected from the list of:
   a print formed on the substrate, optionally with one or more layers of primer located between the substrate and the printing; and preferably finished with a translucent or transparent wear layer, preferably of acrylate, polyurethane or hot melt;
   a vinyl-based layer, preferably at least with a printed polyvinyl chloride (PVC) film and a transparent wear layer, also of polyvinyl chloride (PVC);
   a melamine-based layer, preferably at least with a printed layer of paper and a transparent wear layer mainly of melamine and optionally paper and/or hard particles such as corundum particles;
   a wood veneer layer or a stone veneer layer;
   a layer of linoleum;
   a layer of wood thicker than veneer, namely with a thickness of 2.5 mm or more; and
   a ceramic tile.

In a preferred embodiment of the invention, the floor or wall panel is characterized in that the mineral material consists of gypsum or calcium sulphate, which may or may not comprise fillers.

Preferably the substrate comprises, besides gypsum or calcium sulphate, fibers selected from the list of wood fibers, cellulose fibers, glass fibers, basalt fibers, carbon fibers and plastic fibers such as fibers obtained from polyvinyl alcohol. More preferably, the fibers are incorporated in the substrate as discrete fibers, and not in the form of a cloth or nonwoven.

More preferably, the aforementioned gypsum is phosphogypsum or sulfogypsum, namely gypsum obtain respectively from the production of phosphates or in recycling from coal-fired power stations.

In a preferred embodiment of the invention, the floor or wall panel is characterized in that the mineral material is a magnesium oxide material, for example obtained from reaction with either magnesium chloride or magnesium sulphate or magnesium phosphate, which may or may not comprise fillers.

In a preferred embodiment of the invention, the floor or wall panel is characterized in that the substrate comprises fibers selected from the list of wood fibers, cellulose fibers, glass fibers, basalt fibers, carbon fibers and plastic fibers, for example such as fibers obtained from polyvinyl alcohol;

preferably wherein the fibers are discrete fibers and are not provided as a sheet or surface of textile material in the substrate.

In a preferred embodiment of the invention, the floor or wall panel is characterized in that the substrate has three or more layers, wherein at least two of the three layers have a mutually different composition, wherein the different composition relates to:
- a different density, for example the outermost layers of three layers may have a higher density, preferably at least 5% or 10% higher than a layer located more centrally;
- a different degree of filling, for example the central layer in a substrate of three layers may have a higher degree of filling;
- a different filler.

In a preferred embodiment of the invention, the floor or wall panel is characterized in that the substrate comprises at least three layers, wherein these at least three layers comprise a first layer, a second layer and a third layer, wherein each of these first layer, second layer and third layer comprises mineral material—and preferably a mineral binder, wherein the second layer is located between the first layer and the third layer, wherein, of these three layers, the third layer is located closest to the surface of the panel, wherein the tongue is made mainly in the second layer.

In a preferred embodiment of the invention, the floor or wall panel is characterized in that the substrate comprises three layers, wherein each of the three layers comprises mineral material—and preferably a mineral binder, wherein the substrate comprises a first layer, a second layer and a third layer, wherein the second layer is located between the first layer and the third layer, wherein, of these three layers, the third layer is located closest to the surface of the panel, wherein the lower lip is mainly made in the first layer.

In a preferred embodiment of the invention, the floor or wall panel is characterized in that the substrate comprises three layers, wherein each of the three layers comprises mineral material—and preferably a mineral binder, wherein the substrate comprises a first layer, a second layer and a third layer, wherein the second layer is located between the first layer and the third layer, wherein, of these three layers, the third layer is located closest to the surface of the panel, wherein the upper lip is made at least partly—and preferably mainly—in the third layer.

In a preferred embodiment of the invention, the floor or wall panel is characterized in that the first layer comprises, per unit weight, more filler than the second layer. Preferably wherein the first layer comprises, per unit weight, at least twice as much filler as the second layer. Embodiments of this kind have the advantage that with at least partial provision of the lower lip in the first layer, owing to the larger amount of fillers in this first layer, the lower lip is more flexible and so can bend more easily. This facilitates coupling and prevents the risk of breaking off of the lower lip or cracking in the lower lip during coupling of panels.

In a preferred embodiment of the invention, the floor or wall panel is characterized in that the third layer comprises, per unit weight, more filler than the second layer, preferably wherein the third layer comprises, per unit weight, at least twice as much filler as the second layer.

Preferably the filler comprises or consists of one or more of wood fibers, wood dust, wood particles, other cellulose material, glass fiber, basalt fibers, synthetic fibers, for example PVA fibers.

A smaller amount of fillers in the second layer than in the first and third layer provides a strong, rigid middle layer of the panel. If the tongue is made mainly in the stronger second layer, this is beneficial for the strength of the coupling, whereas the risk of breakage during coupling decreases considerably.

A larger amount of filler in the third layer, especially when this filler comprises or consists of wood chips, wood fibers or wood particles or other cellulose material, is favorable when using a decorative layer that comprises melamine and/or melamine formaldehyde, since the adhesion of this decorative layer to the third layer is better.

An example of a floor or wall panel according to the invention is assembled as follows:
- The substrate comprises three magnesium oxide layers: a first layer, a second layer and a third layer. The second layer is located between the first layer and the third layer.
- The first layer and the third layer comprise between 15 and 30 wt % of wood-based filler, for example wood fiber.
- The second layer comprises between 5 and 15 wt % of wood-based filler, for example wood fiber.
- A melamine formaldehyde-based decorative layer is adhered onto the third layer.
- The tongue is made mainly in the second layer.
- The lower groove is made mainly in the first layer.

More preferably the panel comprises a fourth layer and a fifth layer, wherein the fourth layer consists mainly of mineral material, and is located between the first layer and the second layer, and wherein the fourth layer comprises less filler per unit weight than the second layer. The fifth layer consists mainly of mineral material, and is located between the second layer and the third layer. The fifth layer comprises less filler per unit weight than the second layer. In these embodiments the floor or wall panel has a higher stiffness.

In a preferred embodiment of the invention, the floor or wall panel is characterized in that the floor or wall panel is rectangular, either oblong or square, wherein the panel is provided with mechanical coupling means on both pairs of opposite edges.

In a preferred embodiment of the invention, the floor or wall panel is characterized in that the substrate comprises several layers of mineral material, wherein the several layers of mineral material differ from one another in composition, wherein the lower lip is mainly made in one layer of the several layers, wherein the tongue is mainly made in another layer of the several layers than the layer in which the lower lip is mainly made, wherein the layer in which the lower lip is mainly made has a higher specific elastic flexibility than the layer in which the tongue is mainly made. As a result, it is easier to couple the panels to each other, since the lower lip can be bent downward more easily and without risk of breakage. Specific elastic flexibility means that elastic bending is possible to a greater extent and more easily (i.e. with less force) for a beam with the same length and the same cross section.

A higher specific elastic flexibility may be obtained for example if the layer in which the lower lip is mainly made comprises more filler per unit weight than the layer in which the tongue is mainly made.

A higher specific elastic flexibility may be obtained for example if the layer in which the lower lip is mainly made comprises less mineral binder per unit weight than the layer in which the tongue is mainly made.

In preferred embodiments of the invention, the upper lip is mainly made in a layer of the several layers that has a lower elastic flexibility than the layer in which the lower lip is mainly made.

The second aspect of the invention is a floor or wall covering, in which the floor or wall covering comprises a plurality of floor or wall panels such as in any embodiment of the first aspect of the invention, in which the panels of the plurality of floor or wall panels are coupled to each other on their at least two opposite edges by means of their respective coupling means.

BRIEF DESCRIPTION OF THE DRAWINGS

For the purpose of better illustrating the features of the invention, some preferred embodiments are described hereunder, as examples without any limiting character, referring to the appended drawings, in which.

DETAILED DESCRIPTION OF VARIOUS EMBODIMENTS

Reference numbers that are not defined in the description of the figures are defined in the claims. The dimensions given in the figures are not limiting. The thickness of the panels may be between 7 and 14 mm.

Figure 1:
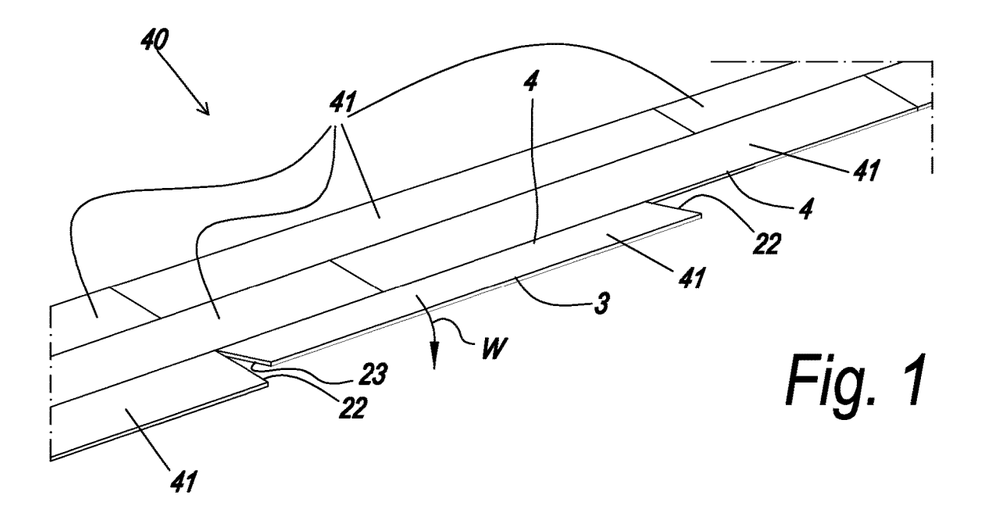
FIG. 1 presents a floor covering according to the invention.

FIG. 1 presents a floor covering 40 according to one aspect of the invention. The floor covering 40 comprises a plurality of floor panels 41, in which the panels of the plurality are coupled to each other on their first pair of opposite edges 3, 4 by means of their respective coupling means; and are also coupled to each other on their second pair of opposite edges 22, 23. Wall coverings according to the invention can also be produced in the same way.

Figure 2:
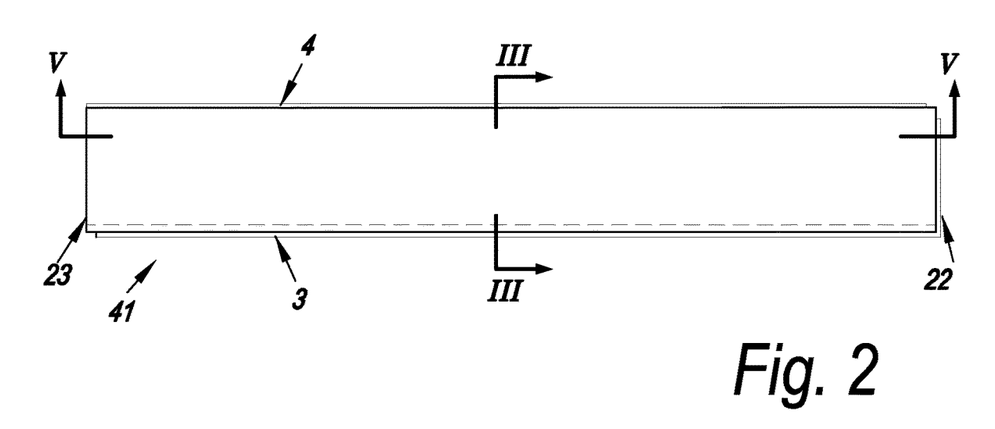
FIG. 2 presents a panel—according to the invention—as used in the floor covering in FIG. 1.

FIG. 2 shows a panel 41 as used in the floor covering in FIG. 1. The panel is oblong and rectangular and comprises on its long edges a first pair of opposite edges 3, 4 provided with coupling means. The pair of short opposite edges 22, 23 is also provided with coupling means.

Figure 3:
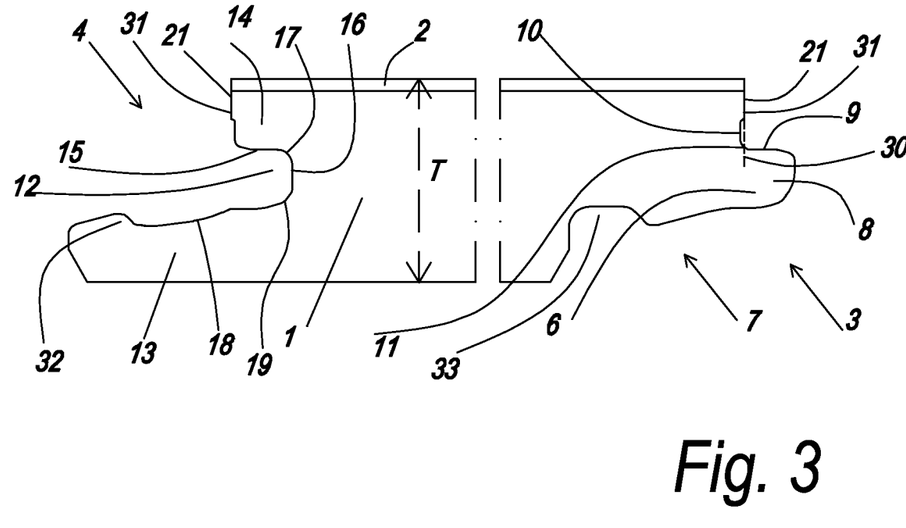
FIG. 3 presents a cross section according to III-III of the panel in FIG. 2.
Figure 4:
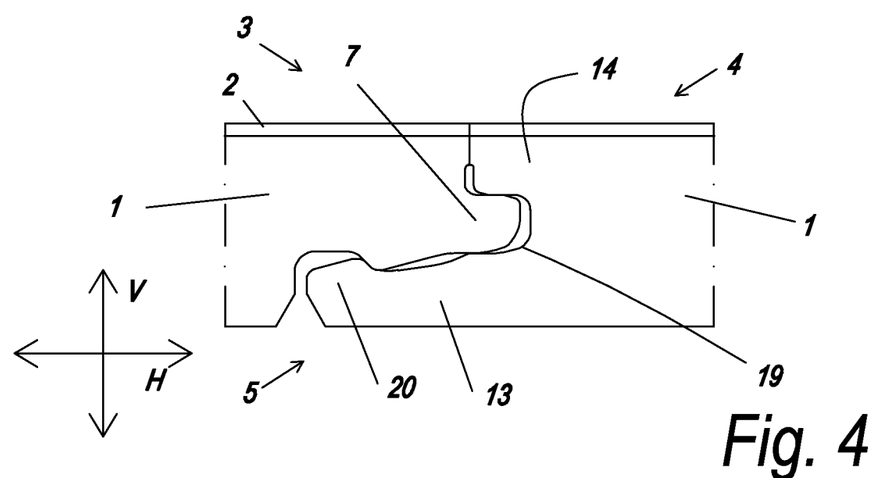
FIG. 4 shows two panels such as in FIGS. 2 and 3 in the coupled state on their long edges.
Figure 5:
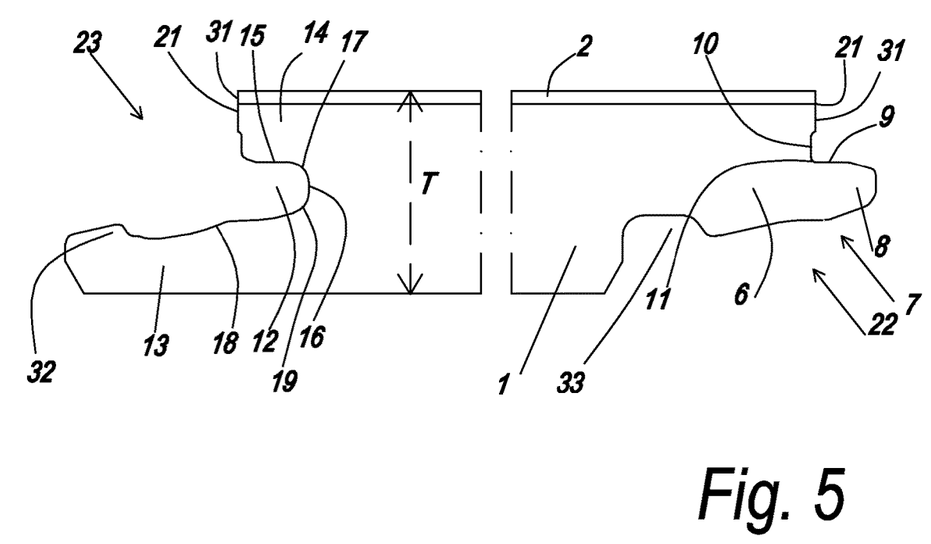
FIG. 5 presents a cross section according to V-V of the panel in FIG. 2.
Figure 6:
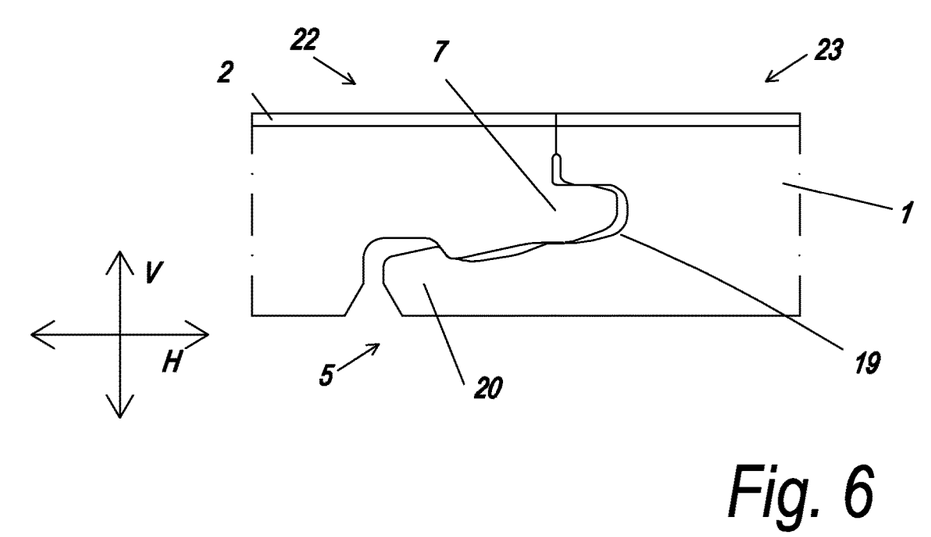
FIG. 6 shows two panels such as in FIGS. 2 and 5 in the coupled state on their short edges.
Figure 7:
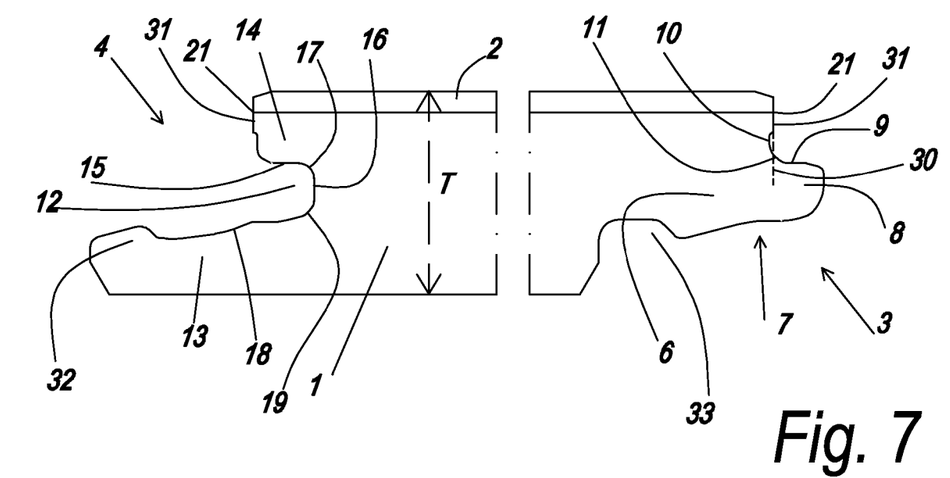
FIGS. 7-10 show a second example of a panel according to the invention shown in the same way as respectively in FIGS. 3, 4, 5 and 6.
Figure 8:
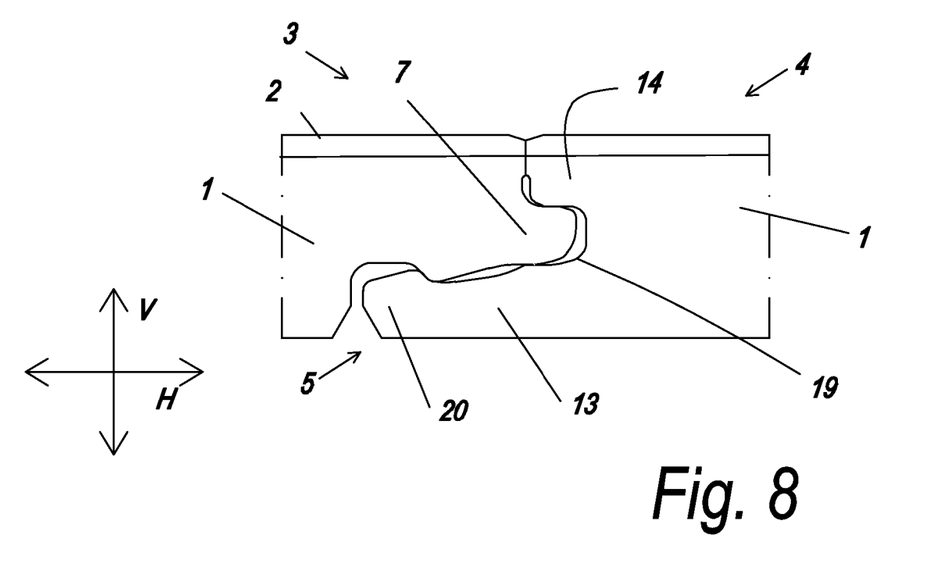
Figure 9:
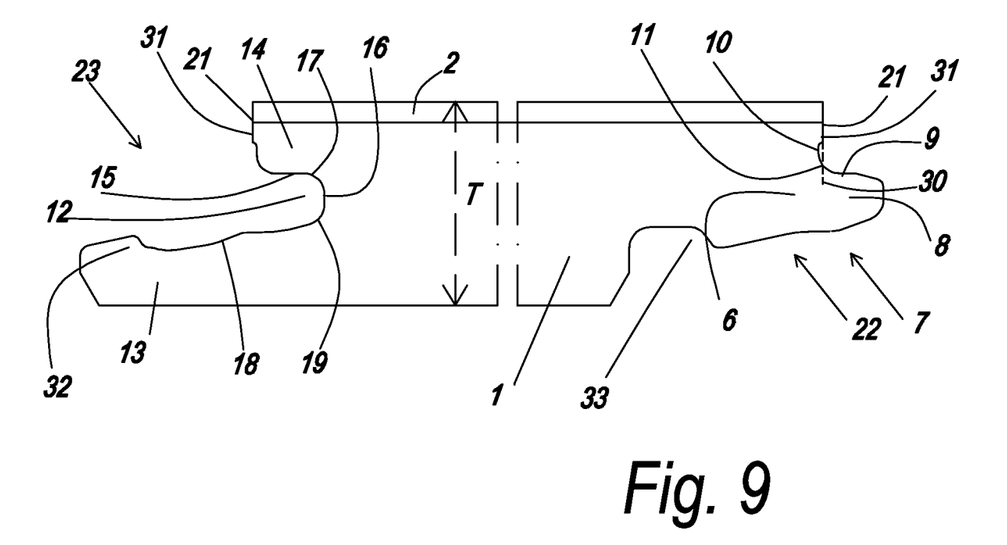
Figure 10:
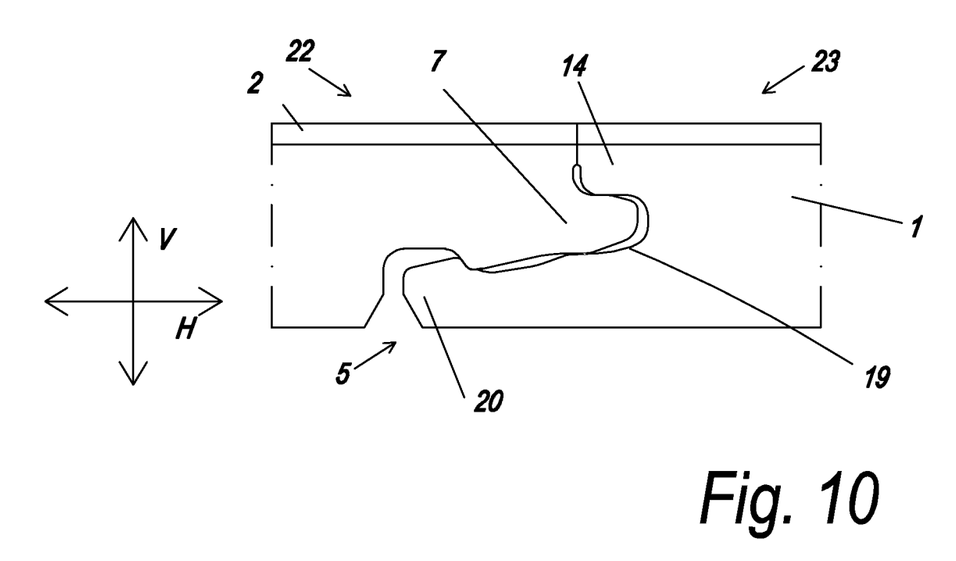
Figure 11:
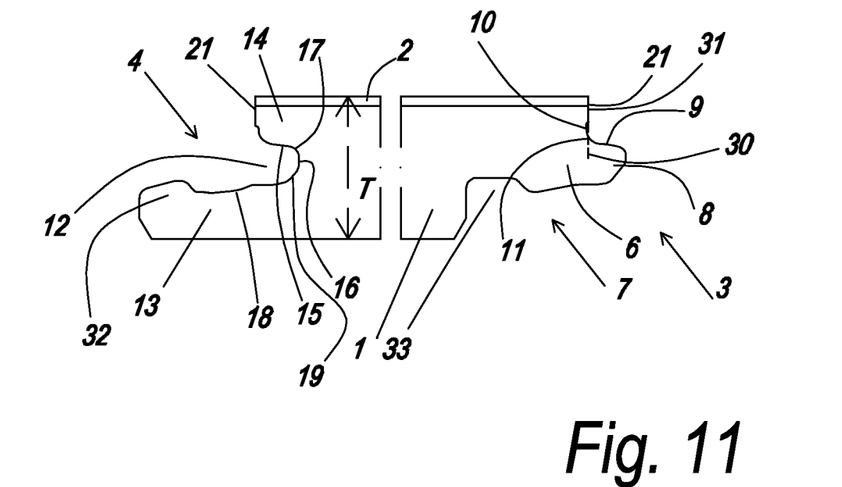
FIGS. 11-14 show a third example of a panel according to the invention shown in the same way as respectively in FIGS. 3, 4, 5 and 6.
Figure 12:
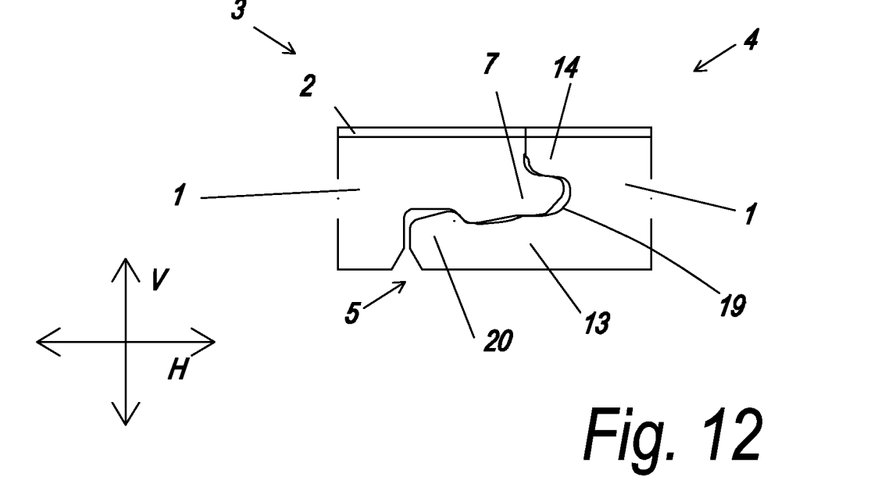
Figure 13:
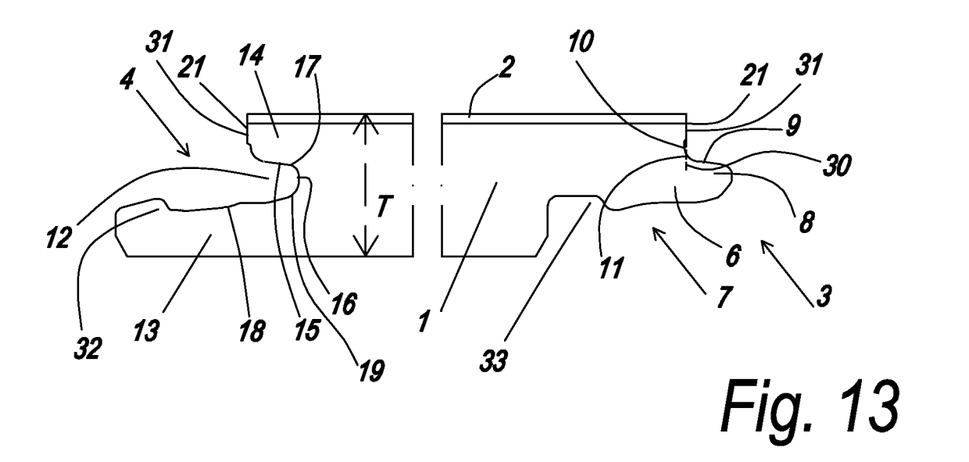
Figure 14:
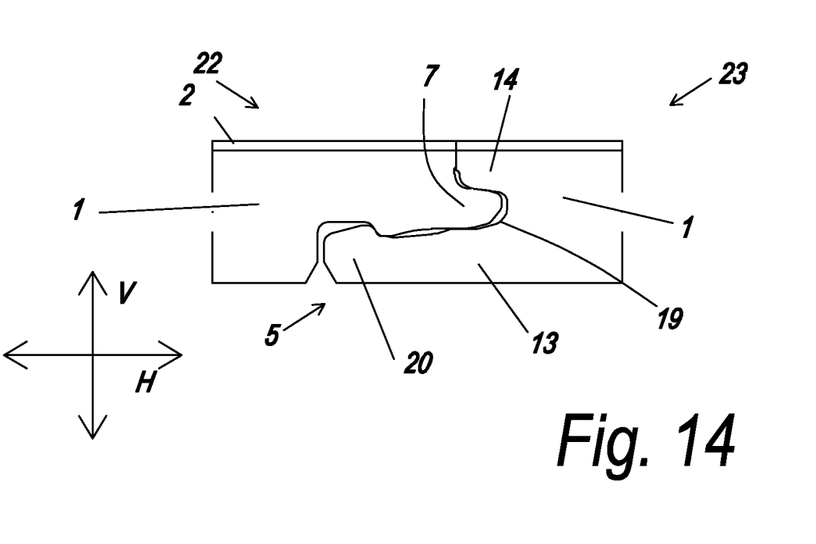

FIGS. 3-6 show an example of a panel such as in FIG. 2. FIG. 3 shows a cross section according to III-III of the panel in FIG. 2. FIG. 4 shows two panels such as in FIG. 2 coupled on their long edges 3, 4, thus on the edges illustrated in FIG. 3. FIG. 5 shows a cross section according to V-V of the panel in FIG. 2. FIG. 6 shows two panels such as in FIG. 2 coupled on their short edges 22, 23, thus on the edges illustrated in FIG. 5.

The panel in FIGS. 2-6 comprises a substrate 1 and a top layer 2 applied thereon, and has a thickness T of 10 mm. The substrate 1 of this panel is a fiber-reinforced plasterboard with a density of more than 900 kg per cubic meter, namely 1000 or even 1300 kilograms per cubic meter or more. The plasterboard comprises at least cellulose fibers. However, it is also possible to make this substrate from some other mineral material: a mineral material that comprises at least one mineral binder, which forms the matrix of the substrate. The panel is provided on its two long opposite edges 3, 4 with coupling means 5 that allow two such panels to be coupled together at the respective edges, wherein in the coupled state there is locking in the vertical direction (V) perpendicular to the plane of the coupled panels and in the horizontal direction (H) perpendicular to the coupled edges and in the plane of the coupled panels.

The coupling means 5 of the one edge 3 of the two long opposite edges 3, 4 comprise a male part 6 in the form of a tongue 7; and on the other edge 4, a female part in the form of a groove 12. This groove is flanked by a lower lip 13 and an upper lip 14, wherein the lower lip comprises a locking element 32 and wherein the bottom edge of the tongue 7 comprises a recess 33, wherein in the coupled state of two such panels, contact between the locking element 32 and the recess 33 provides locking of the coupled panels in the direction perpendicular to the edges coupled in this way and parallel to the plane of the coupled panels.

The tongue 7 comprises a sideways projection 8 formed on the respective edge. The sideways projection adjoins, on the upper side 9 thereof, a surface or plane 10 of the edge, extending substantially vertically, wherein the junction 11 of the upper side 9 of the sideways projection 8 with the surface or plane 10 of the edge extending substantially vertically is free from roundings with a radius less than 0.2 mm.

The aforesaid junction 11 of the upper side 9 of the sideways projection 8 with the surface or plane 10 of the edge extending substantially vertically is curved and adjoins a non-curved part of the sideways projection, wherein the curved junction 11 extends in the distal direction to beyond the vertical plane 30 defined by the vertical contact surface 31 of this edge. This vertical contact surface is designed to make contact with a vertical contact surface 31 of the panel with which this edge is coupled.

The lower surface 15 of the upper lip adjoins the most inward located portion 16 of the groove 12, wherein the junction 17 of the lower surface 15 of the upper lip 14 with the most inward located portion 16 of the groove is free from roundings with a radius less than 0.2 mm.

The upper surface 18 of the lower lip 13 adjoins the most inward located portion 16 of the groove, wherein the junction 19 of the upper surface 18 of the lower lip 13 with the most inward located portion 16 of the groove is free from roundings with a radius less than 0.2 mm.

The coupling means of the pair of long opposite edges 3, 4 of the example in FIG. 3 may be coupled to each other optionally by means of an angling movement or by means of a substantially horizontal movement of the panels.

The coupling means on the two short opposite edges 22, 23 are shown in FIG. 5; FIG. 6 shows two panels such as in FIG. 5 coupled on their two opposite short edges 22, 23. The reference numbers have the same meaning as in FIGS. 3 and 4, which illustrate the long edges 3, 4 and the coupling on the long edges.

FIGS. 7-10 show a second example of a panel according to the invention, shown in the same way as in FIGS. 3, 4, 5 and 6 respectively. The thickness T of this panel is 10 mm. The reference numbers in FIGS. 7-10 have the same meaning as in FIGS. 3-6.

FIGS. 11-14 show a third example of a panel according to the invention, shown in the same way as in FIGS. 3, 4, 5 and 6 respectively. The thickness T of this panel is 7 mm. This panel comprises a substrate that comprises a magnesium oxide binder, but may also be made of other mineral material. The reference numbers in FIGS. 7-10 have the same meaning as in FIGS. 3-6. Besides the characteristic features shown in FIGS. 3-6, the coupling means on the two long opposite edges 3, 4 and on the two short opposite edges 22, 23 have the feature that in the coupled state of two such panels there is no horizontal contact surface between the top edge of the tongue 7 and the bottom edge of the upper lip 14, but that this contact surface slopes downward over its entire length in the direction toward the distal end of the tongue.

Figure 15:
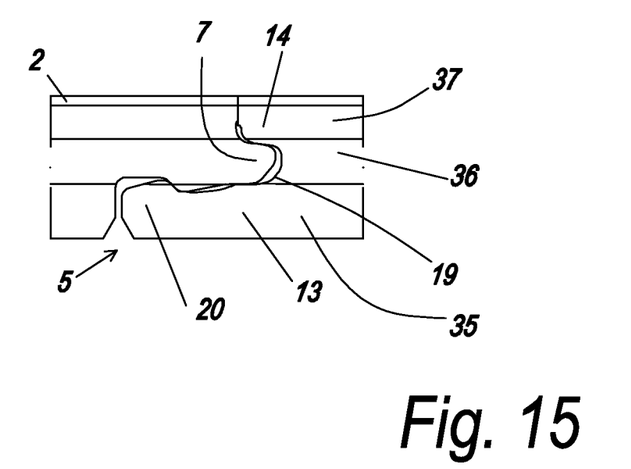
FIG. 15 shows an example of panels according to the invention, in the coupled state, wherein the panels comprise three layers with mineral binder.

FIG. 15 shows an example of panels according to the invention, in the coupled state, wherein the panels comprise three layers with mineral binder. With respect to thickness and the configuration of the coupling means, these panels are the same as the configuration of the coupling means shown in FIGS. 11 and 12. The reference numbers in FIG. 15 then also have the same meaning as the corresponding reference numbers in FIGS. 11 and 12. The panels in FIG. 15 comprise a substrate that comprises three layers made of mineral material: a first layer 35, a second layer 36 and a third layer 37. The second layer 36 is located between the first layer 35 and the third layer 37, wherein the third layer 37 is located closest of these three layers to the surface of the panel. At least two of these three layers have a mutually different composition. Preferably at least the second layer 36 has a different composition than the first layer 35, and preferably also than the third layer 37. The tongue 7 is mainly made in the second layer 36. The lower lip 13 is mainly made in the first layer 35. The upper lip 14 is mainly made in the third layer 37.

It is advantageous if the first layer 35 has a higher specific elastic flexibility than the second layer 36. The first layer 35 may for example comprise more filler per unit weight than the second layer 36. It is also possible to produce the first layer 35 in such a way that it comprises less mineral binder per unit weight than the second layer 36.

The third layer 37 may comprise more filler per unit weight than the second layer 36.

It may be advantageous to produce the second layer 36 in such a way that it has a lower elastic flexibility than the first layer 35.

Figure 16:
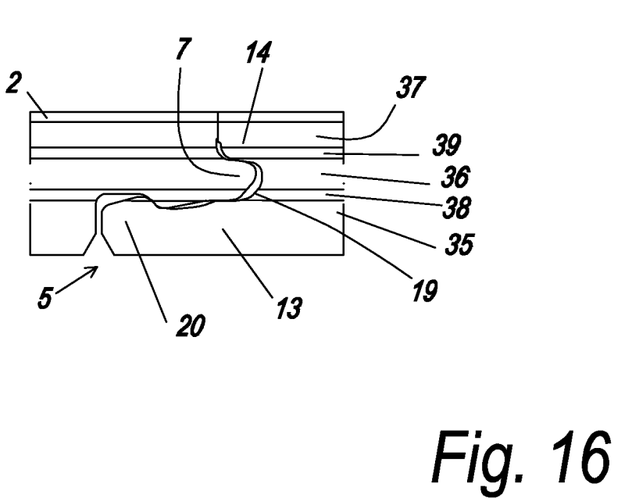
FIG. 16 shows an example of panels according to the invention, in the coupled state, wherein the panels comprise five layers with a mineral binder.

FIG. 16 shows an example of panels according to the invention, in the coupled state, wherein the panels comprise five layers with a mineral binder. The panels in FIG. 16 are largely identical to those in FIG. 15, except that the panels comprise, besides the first layer 35, the second layer 36 and the third layer 37—all made of mineral material—a fourth layer 38 and a fifth layer 39 mainly made of mineral material. The reference numbers have the same meaning as the corresponding reference numbers in the other figures. The fourth layer 38 consists mainly of mineral material and is located between the first layer 35 and the second layer 36, wherein the fourth layer 38 comprises less filler per unit weight than the second layer 36. The fifth layer 39 is located between the second layer 36 and the third layer 37. The fifth layer 39 comprises less filler per unit weight than the second layer 36.

Figure 17:
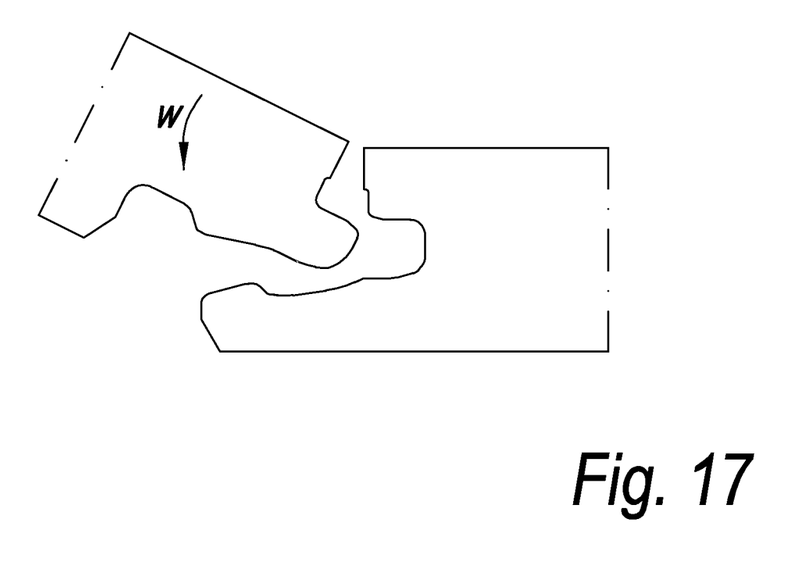
FIG. 17 illustrates coupling by means of an angling movement.

FIG. 17 illustrates coupling by means of an angling movement (W) such as is possible in embodiments of the invention.

Figure 18:
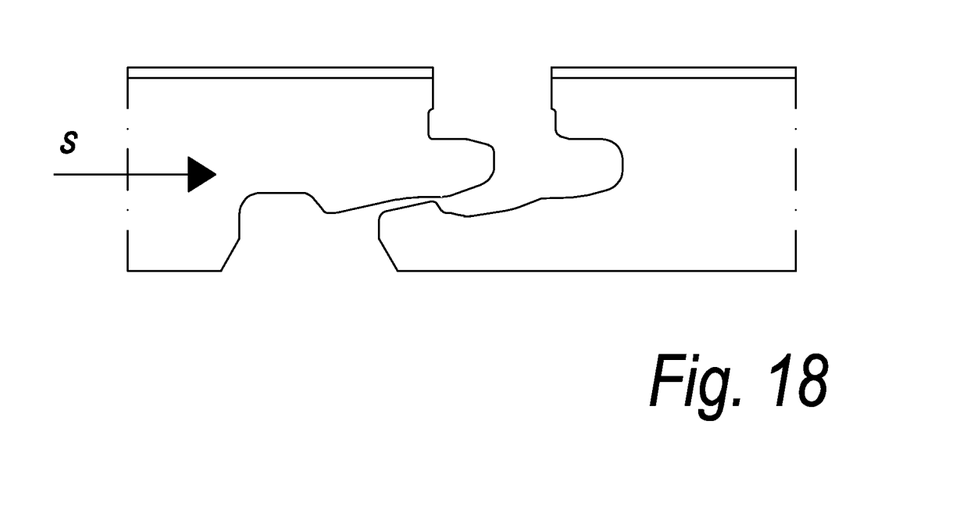
FIG. 18 illustrates coupling by means of a sliding movement.

FIG. 18 illustrates coupling by means of a sliding movement (S) substantially parallel to the surface of the panel, such as is possible in embodiments of the invention.

Figure 19:
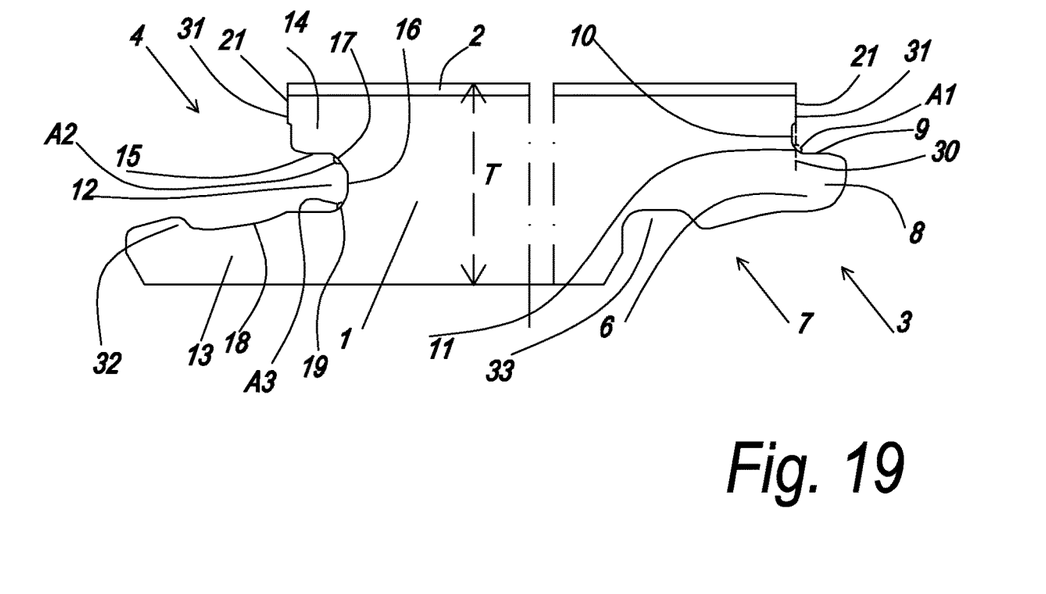
FIGS. 19 and 20 illustrate another example of a panel of the invention.
Figure 20:
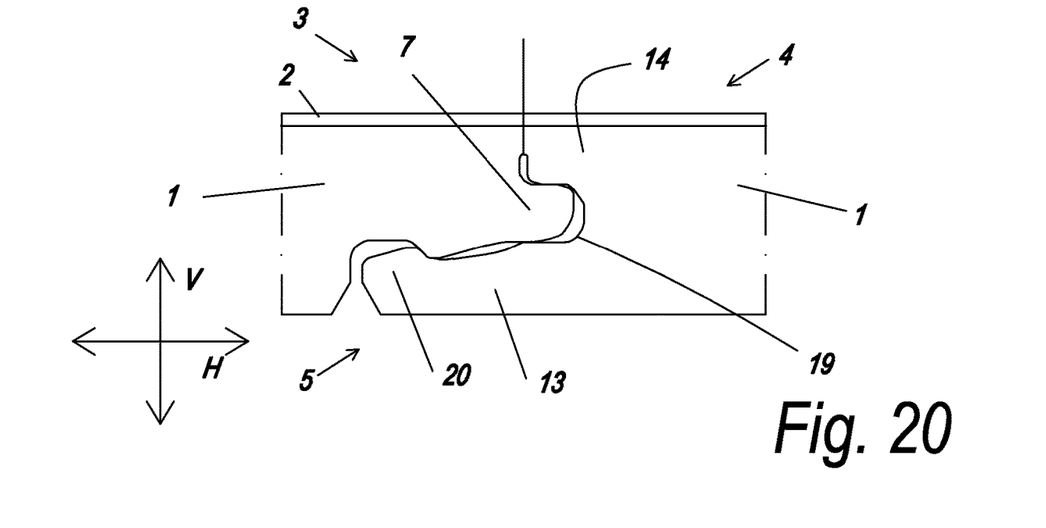

FIGS. 19 and 20 illustrate—in the same representation as in FIGS. 3 and 4 respectively—another example of a panel 1 according to the invention. FIG. 19 shows a panel 1 with its long edges 3, 4. FIG. 20 shows two such panels as in FIG. 19, coupled on their pair of long edges 3, 4. The reference numbers have the same meaning as in the other figures. This panel is broadly similar to the panel illustrated in FIGS. 3 and 4. For the panel shown in FIGS. 19 and 20, the angle A1 between the vertices formed between adjacent surfaces of the junction 11 of the upper side 9 of the sideways projection 8 with the surface or plane 10 of the edge extending substantially vertically, is equal to 157°. The angle A2 between the vertices formed between adjacent surfaces of the junction 17 of the lower surface 15 of the upper lip 14 with the most inward located portion 16 of the groove is 165°. The angle A3 between the vertices formed between adjacent surfaces of the junction 19 of the upper surface 18 of the lower lip 13 with the most inward located portion 16 of the groove is 161°.

The present invention is by no means limited to the embodiments described above and hereunder—these floor or wall panels may be produced according to different variants while remaining within the scope of the present invention.

The invention claimed is:

1. A floor or wall panel, comprising a substrate and a top layer applied thereon, wherein the substrate mainly consists of a mineral material, and in that on first and second edges the panel is provided with coupling means that allow first and second panels arranged as said floor or wall panel to be coupled together at respective edges, wherein in a coupled state there is locking in a vertical direction perpendicular to a plane of coupled panels arranged as said panel, and in a horizontal direction perpendicular to the coupled first and second edges and in the plane of the coupled panels;

wherein said coupling means of the first edge of the first and second edges comprises at least a male part defined by a tongue;

wherein said coupling means on the second edge of the at least two opposite edges comprise at least a female part defined by a groove, wherein the groove is flanked by a lower lip and an upper lip, wherein the lower lip contains a locking element, wherein a bottom edge of the tongue comprises a recess, wherein, in the coupled state of the first and second panels, a contact between the locking element and the recess provides locking of the coupled panels in a direction perpendicular to the coupled first and second edges coupled and parallel to the plane of the coupled panels;

wherein said tongue comprises a sideways projection formed on the respective edge, wherein the sideways projection on an upper side thereof adjoins a surface or plane of the edge extending substantially vertically, and wherein a junction of the upper side of the sideways projection with the surface or plane of the edge extending substantially vertically is free from roundings with a radius less than 0.2 mm and/or in that an angle between vertices formed between adjacent surfaces of the junction is always greater than 150°.

2. The floor or wall panel as in claim 1,
wherein the substrate comprises at least three layers,
wherein these at least three layers comprise a first layer, a second layer and a third layer,
wherein each of the first layer, second layer and third layer comprises mineral material,
wherein the second layer is located between the first layer and the third layer,
wherein, of the three layers, the third layer is located closest to a surface of the panel,
wherein the tongue is mainly made in the second layer.

3. The floor or wall panel as in claim 2, wherein the third layer comprises more filler per unit weight than the second layer, wherein the third layer comprises, per unit weight, at least twice as much filler as the second layer.

4. The floor or wall panel as in claim 2, wherein the first layer comprises more filler per unit weight than the second layer, wherein the first layer comprises at least twice as much filler per unit weight as the second layer.

5. The floor or wall panel as in claim 1, wherein the substrate comprises several layers of mineral material,
wherein the several layers of mineral material differ from one another in composition,
wherein the lower lip is mainly made in a first layer of the several layers,
wherein the tongue is mainly made in a second layer of the several layers than the second layer from which the lower lip is mainly made,
wherein the first layer in which the lower lip is mainly made has a higher specific elastic flexibility than the second layer in which the tongue is mainly made.

6. The floor or wall panel as in claim 5, in which the upper lip is mainly made in a third layer of the several layers that has a lower elastic flexibility than the first layer in which the lower lip is mainly made.

7. A floor or wall panel, comprising a substrate and a top layer applied thereon,
wherein the substrate mainly consists of a mineral material, and in that on at least opposite first and second edges the panel is provided with coupling means that allow first and second panels arranged as said floor or wall panel to be coupled together at respective edges,
wherein in a coupled state there is locking in a vertical direction perpendicular to a plane of coupled panels arranged as said panel, and in a horizontal direction perpendicular to the coupled first and second edges and in the plane of the coupled panels;
wherein said coupling means of the first edge of the first and second edges comprises at least a male part defined by a tongue;
wherein said coupling means on the second edge of the first and second edges comprise at least a female part defined by a groove,
wherein the groove is flanked by a lower lip and an upper lip, wherein the lower lip contains a locking element,
wherein a bottom edge of the tongue comprises a recess,
wherein, in the coupled state of the first and second panels, a contact between the locking element and the recess provides locking of the coupled panels in a direction perpendicular to the edges coupled and parallel to the plane of the coupled panels;
wherein the groove is flanked by a lower lip and an upper lip,
wherein a lower surface of the upper lip adjoins a most inward located portion of the groove, and
wherein a junction of the lower surface of the upper lip with the most inward located portion of the groove is free from roundings with a radius less than 0.2 mm and/or in that an angle between vertices formed between adjacent surfaces of the junction is always greater than 150°.

8. The floor or wall panel as in claim 7, wherein the substrate comprises at least three layers,
wherein the at least three layers comprise a first layer, a second layer and a third layer,
wherein each of the first layer, second layer and third layer comprises mineral material,
wherein the second layer is located between the first layer and the third layer,
wherein, of the three layers, the third layer is located closest to the surface of the panel,
wherein the lower lip is mainly made in the first layer.

9. The floor or wall panel as in claim 8, wherein the third layer comprises more filler per unit weight than the second layer, wherein the third layer comprises, per unit weight, at least twice as much filler as the second layer.

10. The floor or wall panel as in claim 8, wherein the first layer comprises more filler per unit weight than the second layer, wherein the first layer comprises at least twice as much filler per unit weight as the second layer.

11. The floor or wall panel as in claim 7, wherein the substrate comprises several layers of mineral material,
wherein the several layers of mineral material differ from one another in composition,
wherein the lower lip is mainly made in a first layer of the several layers,
wherein the tongue is mainly made in a second layer of the several layers than the second layer from which the lower lip is mainly made,
wherein the first layer in which the lower lip is mainly made has a higher specific elastic flexibility than the second layer in which the tongue is mainly made.

12. The floor or wall panel as in claim 11, in which the upper lip is mainly made in a third layer of the several layers that has a lower elastic flexibility than the first layer in which the lower lip is mainly made.

13. A floor or wall panel, comprising a substrate and a top layer applied thereon,
wherein the substrate mainly consists of a mineral material, and in that on first and second edges the panel is provided with coupling means that allow first and second panels arranged as said floor or wall panel to be coupled together at respective edges,
wherein in a coupled state there is locking in a vertical direction perpendicular to a plane of coupled panels arranged as said panel, and in a horizontal direction perpendicular to the coupled first and second edges and in the plane of the coupled panels;
wherein said coupling means of the first edge of the first and second edges comprises at least a male part defined by a tongue;
wherein said coupling means on the second edge of the at least two opposite edges comprise at least a female part defined by a groove,
wherein the groove is flanked by a lower lip and an upper lip, wherein the lower lip contains a locking element,
wherein a bottom edge of the tongue comprises a recess, wherein, in the coupled state of the first and second panels, a contact between the locking element and the recess provides locking of the coupled panels in a direction perpendicular to the edges coupled and parallel to the plane of the coupled panels;

wherein this groove is flanked by a lower lip and an upper lip, wherein an upper surface of the lower lip adjoins a most inward located portion of the groove, and wherein a junction of the upper surface of the lower lip with the most inward located portion of the groove is free from roundings with a radius less than 0.2 mm and/or in that an angle between vertices formed between adjacent surfaces of the junction is always greater than 150°.

14. The floor or wall panel as in claim 13, wherein the substrate comprises at least three layers, wherein the at least three layers comprise a first layer, a second layer and a third layer, wherein each of the first layer, second layer and third layer comprises mineral material, wherein the second layer is located between the first layer and the third layer, wherein, of the three layers, the third layer is located closest to the surface of the panel, wherein the lower lip is mainly made in the first layer.

15. The floor or wall panel as in claim 14, wherein the third layer comprises more filler per unit weight than the second layer, wherein the third layer comprises, per unit weight, at least twice as much filler as the second layer.

16. The floor or wall panel as in claim 14, wherein the first layer comprises more filler per unit weight than the second layer, wherein the first layer comprises at least twice as much filler per unit weight as the second layer.

17. The floor or wall panel as in claim 13, wherein the substrate comprises several layers of mineral material, wherein the several layers of mineral material differ from one another in composition, wherein the lower lip is mainly made in a first layer of the several layers, wherein the tongue is mainly made in a second layer of the several layers than the first layer in which the lower lip is mainly made, wherein the first layer in which the lower lip is mainly made has a higher specific elastic flexibility than the second layer in which the tongue is mainly made.

18. The floor or wall panel as in claim 17, in which the upper lip is mainly made in a third layer of the several layers that has a lower elastic flexibility than the first layer in which the lower lip is mainly made.

* * * * *